United States Patent
Feng et al.

(10) Patent No.: US 9,723,218 B2
(45) Date of Patent: Aug. 1, 2017

(54) METHOD AND DEVICE FOR SHOOTING A PICTURE

(71) Applicant: Xiaomi Inc., Beijing (CN)

(72) Inventors: Jingmin Feng, Beijing (CN); Qi Ge, Beijing (CN); Lin Liu, Beijing (CN)

(73) Assignee: Xiaomi Inc., Beijing (CN)

( * ) Notice: Subject to any disclaimer, the term of this patent is extended or adjusted under 35 U.S.C. 154(b) by 0 days.

(21) Appl. No.: 14/791,678

(22) Filed: Jul. 6, 2015

(65) Prior Publication Data
US 2016/0165117 A1 Jun. 9, 2016

Related U.S. Application Data

(63) Continuation of application No. PCT/CN2015/078104, filed on Apr. 30, 2015.

(30) Foreign Application Priority Data

Dec. 9, 2014 (CN) .......................... 2014 1 0748992

(51) Int. Cl.
*H04N 5/228* (2006.01)
*H04N 5/235* (2006.01)
(Continued)

(52) U.S. Cl.
CPC ....... *H04N 5/2353* (2013.01); *H04N 5/23251* (2013.01)

(58) Field of Classification Search
CPC .... H04N 5/235; H04N 5/353; H04N 5/23248; H04N 5/23267; H04N 5/2351;
(Continued)

(56) References Cited

U.S. PATENT DOCUMENTS 7,546,026 B2 6/2009 Pertsel et al.
8,189,057 B2 5/2012 Pertsel et al.
(Continued)

FOREIGN PATENT DOCUMENTS

CN 101346987 A 1/2009
CN 101867717 A 10/2010
(Continued)

OTHER PUBLICATIONS

International Search Report and Written Opinion (including English translation) issued in corresponding International Application No. PCT/CN2015/078104, mailed Sep. 11, 2015, 13 pages.
(Continued)

*Primary Examiner* — Xi Wang

(57) ABSTRACT

The present disclosure relates to a method and a device for shooting a picture, which belongs to a photography field. The method includes: obtaining a motion parameter of a mobile terminal; determining a current shooting parameter according to the motion parameter; shooting the picture according to the current shooting parameter. The present disclose solves the problem that there is obvious smear in a shot picture due to a movement of a mobile terminal and achieves the effects that the current shooting parameter is determined according to the motion parameter of the mobile terminal and that there is no smear or little smear in the shot picture.

12 Claims, 4 Drawing Sheets

(51) Int. Cl.
*G03B 7/00* (2014.01)
*H04N 5/232* (2006.01)

(58) Field of Classification Search
CPC ........ G03B 7/00; G03B 9/58; G03B 2207/00; G03B 2205/0007; G03B 2207/005; G03B 2217/005; G02B 27/646
USPC ...... 348/362, 222.1, 208.99, 219.1; 396/213, 396/52, 13; 359/554
See application file for complete search history.

(56) References Cited

U.S. PATENT DOCUMENTS

| | | | |
|---|---|---|---|
| 2005/0248660 A1* | 11/2005 | Stavely | G03B 39/00 348/208.16 |
| 2006/0152598 A1 | 7/2006 | Kawarada | |
| 2006/0280429 A1* | 12/2006 | Shimosato | H04N 1/32112 386/209 |
| 2007/0071424 A1 | 3/2007 | Poon et al. | |
| 2007/0092244 A1 | 4/2007 | Pertsel et al. | |
| 2007/0223908 A1* | 9/2007 | Sakamoto | H04N 5/2351 396/234 |
| 2008/0204564 A1* | 8/2008 | Yumiki | H04N 5/23219 348/208.99 |
| 2008/0260366 A1* | 10/2008 | Brosnan | H04N 5/23248 396/52 |
| 2009/0179995 A1* | 7/2009 | Fukumoto | H04N 5/23248 348/208.6 |
| 2009/0256921 A1 | 10/2009 | Pertsel et al. | |
| 2012/0108292 A1 | 5/2012 | Zhong | |

FOREIGN PATENT DOCUMENTS

| | | |
|---|---|---|
| CN | 102404495 A | 4/2012 |
| CN | 102857685 A | 1/2013 |
| CN | 104519282 A | 4/2015 |
| EP | 1770989 A2 | 4/2007 |
| JP | 2006129074 A | 5/2006 |
| JP | 2008289032 A | 11/2008 |
| JP | 2009033566 A | 2/2009 |
| JP | 2010062987 A | 3/2010 |
| JP | 2011114662 A | 6/2011 |
| KR | 1020130134209 A | 12/2013 |
| WO | 0229707 A2 | 4/2002 |

OTHER PUBLICATIONS

Extended European Search Report issued in corresponding EP Application No. 15181566, dated Apr. 22, 2016, 8 pages.

Office Action (including English translation) issued in corresponding Korean Patent Application No. 10-2015-7018220, dated May 4, 2016, 9 pages.

Office Action (including English translation) issued in corresponding Korean Patent Application No. 10-2015-7018220, dated Nov. 16, 2016, 5 pages.

Office Action (including English translation) issued in corresponding Japanese Patent Application No. 2016-563239, dated Feb. 21, 2017, 13 pages.

First Office Action (including English translation) issued in corresponding Chinese Patent Application No. 201410748992.6, dated May 4, 2017, 11 pages.

Office Action (including English translation) issued in corresponding Russian Patent Application No. 2015126003/28 (040388), dated May 4, 2017, 8 pages.

Office Action (including English translation) issued in corresponding Japanese Patent Application No. 2016-563239, dated May 23, 2017, 9 pages.

* cited by examiner

METHOD AND DEVICE FOR SHOOTING A PICTURE

CROSS-REFERENCE TO RELATED APPLICATION

The present application is a continuation application of International Application No. PCT/CN2015/078104, filed with the State Intellectual Property Office of P. R. China on Apr. 30, 2015, which is based upon and claims priority to Chinese Patent Application No. 201410748992.6, filed on Dec. 9, 2014, the entirety contents of which are incorporated herein by reference.

TECHNICAL FIELD

The present disclosure relates to a photography field, and more particularly, to a method for shooting a picture and a device for shooting a picture.

BACKGROUND

In a mobile terminal such as a smart phone, a panel computer, a smart camera, etc., a shooting function is one of the functions most frequently used by a user.

The mobile terminal usually provides several shooting modes. A shooting parameter in each shooting mode is relatively fixed. During shooting a picture using the mobile terminal, the user may select one of the shooting modes to shoot the picture. Since the mobile terminal may be in a jitter state or in motion, there is obvious smear in the picture shot according to the relatively fixed shooting parameter, due to a movement of the mobile terminal.

SUMMARY

In order to overcome the problem that there is obvious smear in a shot picture due to a movement of a mobile terminal, the present disclosure provides a method for shooting a picture and a device for shooting a picture. The solutions are as follows.

According to a first aspect of embodiments of the present disclosure, there is provided a method for shooting a picture. The method may include the following act: obtaining a motion parameter of a mobile terminal; determining a current shooting parameter according to the motion parameter; and shooting the picture according to the current shooting parameter.

According to a second aspect of embodiments of the present disclosure, there is provided a device for shooting a picture. The device may include: an obtaining module circuitry, configured to obtain a motion parameter of a mobile terminal; a determining module circuitry, configured to determine a current shooting parameter according to the motion parameter; and a shooting module circuitry, configured to shoot the picture according to the current shooting parameter.

According to a third aspect of embodiments of the present disclosure, there is provided a device for shooting a picture, including: a processor; a memory configured to store instructions executable by the processor; in which the processor is configured to: obtain a motion parameter of a mobile terminal; determine a current shooting parameter according to the motion parameter; and shoot the picture according to the current shooting parameter.

It is to be understood that both the foregoing general description and the following detailed description are exemplary and explanatory only and are not restrictive of the disclosure, as claimed.

BRIEF DESCRIPTION OF THE DRAWINGS

The accompanying drawings, which are incorporated in and constitute a part of this specification, illustrate embodiments consistent with the disclosure and, together with the description, serve to explain the principles of the disclosure.

With reference to above drawings, specific embodiments of the present disclosure are illustrated, and more detailed descriptions will be explained hereafter. These drawings and descriptions are not intended to limit the scope of the present disclosure in any way, but to explain the concept of the present disclosure to those skilled in the art with reference to the specific embodiments.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the disclosure. Instead, they are merely examples of apparatuses and methods consistent with aspects related to the disclosure as recited in the appended claims.

The mobile terminal herein is an electronic device capable of shooting a picture. The mobile terminal may be a mobile phone, a panel computer, an ebook reader, an MP3 (Moving Picture Experts Group Audio Layer III) player, an MP4 (Moving Picture Experts Group Audio Layer IV) player, a laptop portable computer and so on.

Figure 1:
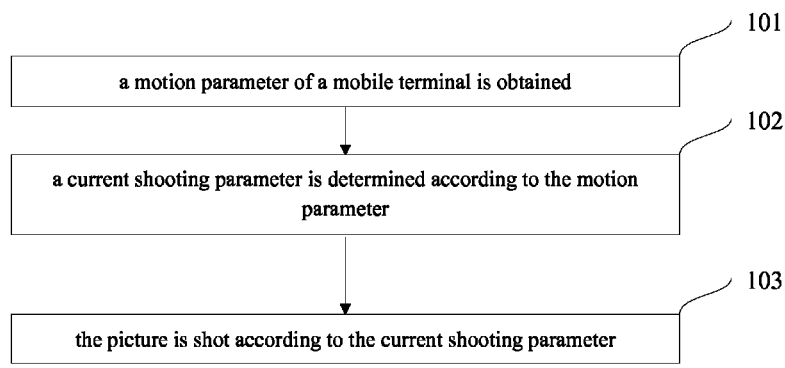
FIG. 1 is a flow chart illustrating a method for shooting a picture according to an exemplary embodiment of the present disclosure.

FIG. 1 is a flow chart illustrating a method for shooting a picture according to an exemplary embodiment of the present disclosure. In this embodiment, take the method for shooting a picture being applied in a mobile terminal capable of shooting a picture as an example. The method for shooting a picture may include the following steps.

In step 101, a motion parameter of a mobile terminal is obtained. For example, the mobile terminal may include one or more sensors to detect and obtain one or more motion parameters of the mobile terminal. The one or more sensors may include microelectromechanical systems (MEMS) sensors, nanoelectromechanical systems (NEMS) sensors, or any other types of sensors.

In step 102, a current shooting parameter is determined according to the motion parameter. For example, the mobile terminal may include one or more control circuitry to determine the current shooting parameter according to the one or more motion parameters of the mobile terminal. The control circuitry may include an IC chip, a microchip, or any other controllers.

In step 103, the picture is shot according to the current shooting parameter. The mobile terminal may include a circuitry to set the shooting parameter to control the different trade-offs of the picture quality. The circuitry may include application specific integrated circuits (ASICs), digital signal processors (DSPs), digital signal processing devices (DSPDs), programmable logic devices (PLDs), field programmable gate arrays (FPGAs), or other types of integrated circuits.

As described above, with the method for shooting a picture according to this embodiment, by determining the current shooting parameter according to the motion parameter of the mobile terminal, and by shooting the picture according to the current shooting parameter, the problem that there is obvious smear in the shot picture due to the movement of the mobile terminal is solved, thus achieving the effects that the current shooting parameter is determined according to the motion parameter of the mobile terminal and that there is no smear or little smear in the shot picture.

Figure 2:
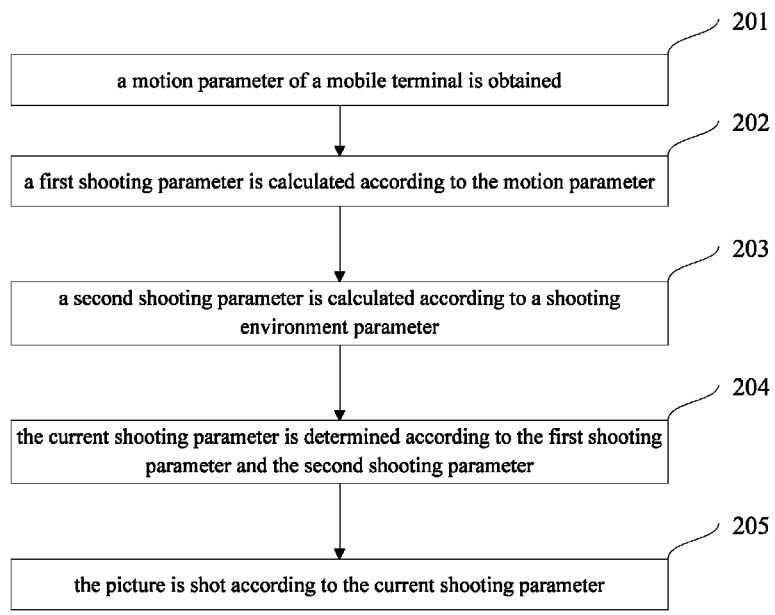
FIG. 2 is a flow chart illustrating a method for shooting a picture according to another exemplary embodiment of the present disclosure.

FIG. 2 is a flow chart illustrating a method for shooting a picture according to another exemplary embodiment of the present disclosure. In this embodiment, take the method for shooting a picture being applied in a mobile terminal capable of shooting a picture as an example. The method for shooting a picture may include the following steps.

In step 201, a motion parameter of a mobile terminal is obtained.

The mobile terminal is always provided with an internal sensor, such as a gravitational acceleration sensor, a gyroscope sensor and an electronic compass sensor.

During shooting a picture, the mobile terminal obtains its own motion parameter by the internal sensor. The motion parameter includes at least one of acceleration, a linear speed and an angular speed. The motion parameter is configured to represent a motion characteristic of the mobile terminal.

In step 202, a first shooting parameter is calculated according to the motion parameter.

The first shooting parameter may include at least one of an exposure time, an aperture value and a photosensibility. Since the smear usually results from a long time of exposure, in this embodiment, take the first shooting parameter being the exposure time as an example.

A first correspondence relationship may be preset in the mobile terminal. The first correspondence relationship includes at least one group of motion parameters and a first shooting parameter corresponding to each group of motion parameters. One example of first correspondence relationship is shown in Table 1.

TABLE 1

| Motion parameter | First shooting parameter |
| --- | --- |
| the current acceleration is within an acceleration interval (v1, v2) | exposure time 11 |

TABLE 1-continued

| Motion parameter | First shooting parameter |
| --- | --- |
| the current acceleration is within an acceleration interval (v2, v3) | exposure time 12 |
| the current acceleration is within an acceleration interval (v3, v4) | exposure time 13 |

When obtaining the current motion parameter, the mobile terminal queries the first shooting parameter corresponding to the current motion parameter in the first correspondence relationship.

It should be explained that, an implementation form of the first correspondence relationship is not limited in this embodiment, the first correspondence relationship may be implemented by other forms or algorithms, as long as the motion speed of the mobile terminal is negatively correlated with the exposure time, i.e. the faster the mobile terminal moves, the shorter the exposure time is, and the slower the mobile terminal moves, the longer the exposure time is.

In step 203, a second shooting parameter is calculated according to a shooting environment parameter.

The shooting environment parameter may include at least one of a shooting time, a shooting location, a light intensity and a white balance parameter. The mobile terminal may obtain the shooting time by an internal clock, obtain the shooting location by an internal positioning module, obtain the light intensity by a light intensity sensor, and obtain the white balance parameter by a white balance sensor. For simplicity, in this embodiment, take the shooting environment parameter being the light intensity as an example.

The second shooting parameter may include at least one of the exposure time, the aperture value and the photosensibility. Since the aperture value of the camera in the mobile terminal is typically fixed, in this embodiment, take the second shooting parameter including the exposure time and the photosensibility as an example.

A second correspondence relationship may be preset in the mobile terminal. The second correspondence relationship includes at least one group of shooting environment parameters and a second shooting parameter corresponding to each group of shooting environment parameters. One example of second correspondence relationship is shown in Table 2.

TABLE 2

| Shooting environment parameter | Second shooting parameter |
| --- | --- |
| the current light intensity is within a light intensity interval (d1, d2) | exposure time 21 + actual photosensibility ISO1 |
| the current light intensity is within a light intensity interval (d2, d3) | exposure time 22 + actual photosensibility ISO2 |
| the current light intensity is within a light intensity interval (d3, d4) | exposure time 23 + actual photosensibility ISO3 |

When obtaining the current shooting environment parameter, the mobile terminal queries the second shooting parameter corresponding to the current shooting environment parameter in the second correspondence relationship.

Similarly, a implementation form of the second correspondence relationship is not limited in this embodiment, and the second correspondence relationship may be implemented by other forms or algorithms.

In step 204, the current shooting parameter is determined according to the first shooting parameter and the second shooting parameter.

The mobile terminal selects one of the first shooting parameter and the second shooting parameter as the current shooting parameter according to a predetermined condition. If the first shooting parameter includes a first exposure time T1 and the second shooting parameter includes a second exposure time T2 and an actual photosensibility, the predetermined condition may include that a shorter one of the first exposure time T1 and the second exposure time T2 is set as the current exposure time. A short exposure time may avoid or reduce the smear.

Alternatively or additionally, the predetermined condition may further include that a current exposure is ensured to be an exposure corresponding to the shooting environment parameter. If the aperture value is constant, the exposure may be calculated by a formula of exposure=$\alpha$*exposure time in the second shooting parameter*actual photosensibility in the second shooting parameter, where $\alpha$ is a predetermined constant. The exposure corresponding to the shooting environment parameter may guarantee the quality of the shot picture.

As a possible implementation, the step includes following steps.

First, the mobile terminal detects which one of the first exposure time T1 and the second exposure time T2 is the greater one.

Second, if the first exposure time T1 is greater than or equal to the second exposure time T2, the mobile terminal sets the second exposure time T2 as the current exposure time, and sets the actual photosensibility as the current photosensibility.

Third, if the first exposure time T1 is less than the second exposure time T2, the mobile terminal sets the first exposure time T1 as the current exposure time, and sets a sum of the actual photosensibility and a compensation photosensibility as the current photosensibility.

The method of calculating the compensation photosensibility is not limited in this embodiment, as long as the current exposure is the exposure corresponding to the shooting environment parameter.

In step 205, the picture is shot according to the current shooting parameter.

The mobile terminal shoots the picture according to the current shooting parameter, i.e. the mobile terminal shoots the picture according to the current exposure time and the current photosensibility.

The mobile terminal may perform above steps automatically after a user presses the shutter, without the need of other manual operations from the user.

As described above, with the method for shooting a picture according to this embodiment, by determining the current shooting parameter according to the motion parameter of the mobile terminal, and by shooting the picture according to the current shooting parameter, the problem that there is obvious smear in the shot picture due to the movement of the mobile terminal is solved, thus achieving the effects that the current shooting parameter is determined according to the motion parameter of the mobile terminal and that there is no smear or little smear in the shot picture.

With the method for shooting a picture according to this embodiment, the smear may be avoided or reduced by selecting the shorter one of the first exposure time T1 and the second exposure time T2 as the current exposure time.

With the method for shooting a picture according to this embodiment, by adding the compensation photosensibility when the first exposure time T1 is selected, the current exposure is ensured to be the exposure corresponding to the shooting environment parameter, thus ensuring the quality of the picture shot as the mobile terminal moves.

Figure 3:
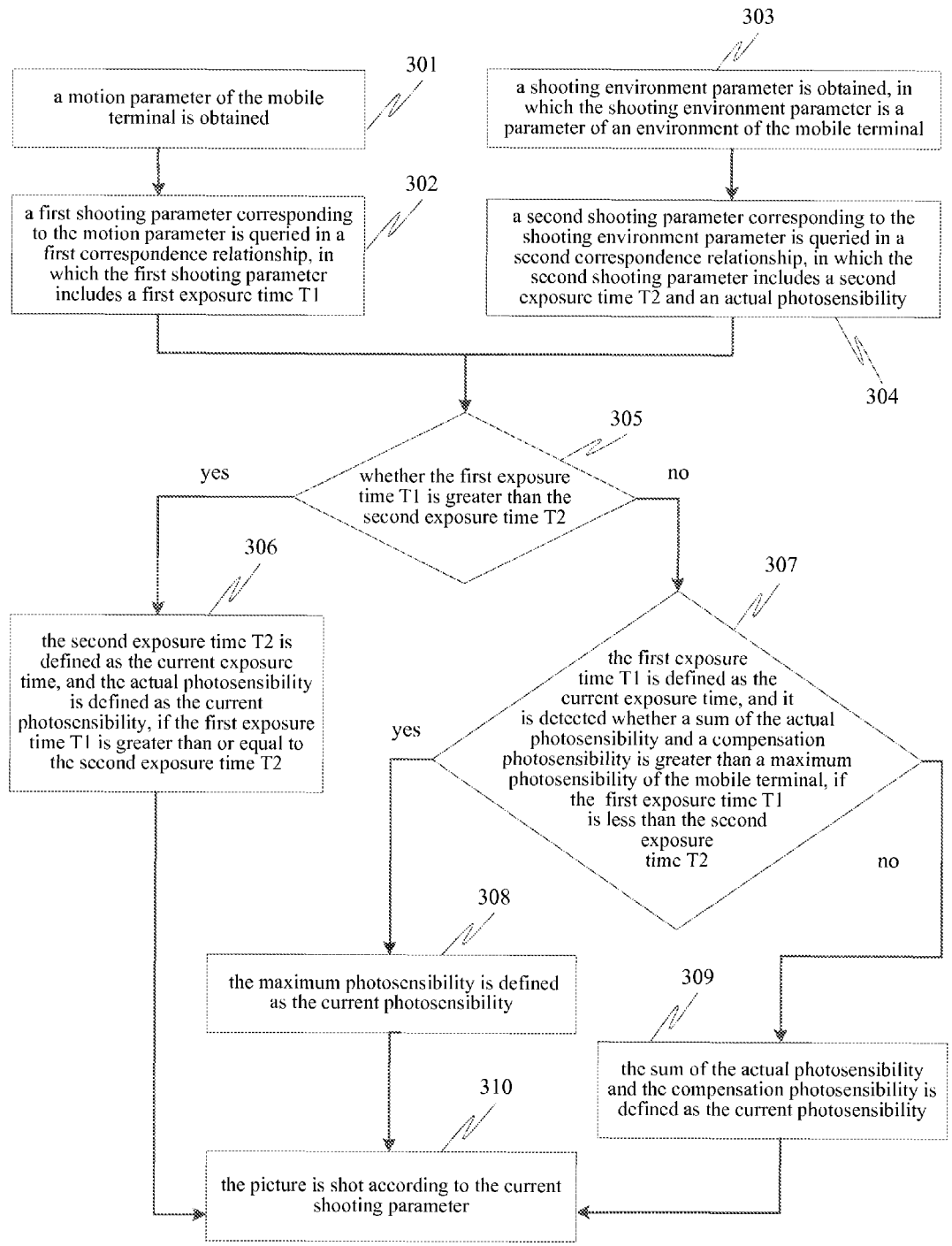
FIG. 3 is a flow chart illustrating a method for shooting a picture according to another exemplary embodiment of the present disclosure.

FIG. 3 is a flow chart illustrating a method for shooting a picture according to another exemplary embodiment of the present disclosure. In this embodiment, take the method for shooting a picture being applied in a mobile terminal capable of shooting a picture as an example. The method for shooting a picture may include the following steps.

In step 301, a motion parameter of the mobile terminal is obtained.

The mobile terminal is always provided with an internal sensor, such as a gravitational acceleration sensor, a gyroscope sensor and an electronic compass sensor.

During shooting a picture, the mobile terminal obtains its own motion parameter by the internal sensor. The motion parameter includes at least one of acceleration, a linear speed and an angular speed. The motion parameter is configured to represent a motion characteristic of the mobile terminal.

In step 302, a first shooting parameter corresponding to the motion parameter is queried in a first correspondence relationship, in which the first shooting parameter includes a first exposure time T1.

The first correspondence relationship includes at least one group of motion parameters and a first shooting parameter corresponding to each group of motion parameters. One example of the first correspondence relationship is shown in Table 1.

When obtaining the current motion parameter, the mobile terminal queries the first shooting parameter corresponding to the current motion parameter in the first correspondence relationship. The first shooting parameter includes the first exposure time T1.

In step 303, a shooting environment parameter is obtained, in which the shooting environment parameter is a parameter of an environment of the mobile terminal.

The shooting environment parameter may include at least one of a shooting time, a shooting location, a light intensity and a white balance parameter. The mobile terminal may obtain the shooting time by an internal clock, obtain the shooting location by an internal positioning module, obtain the light intensity by a light intensity sensor, and obtain the white balance parameter by a white balance sensor. For simplicity, in this embodiment, take the shooting environment parameter being the light intensity as an example.

In step 304, a second shooting parameter corresponding to the shooting environment parameter is queried in a second correspondence relationship, in which the second shooting parameter includes a second exposure time T2 and an actual photosensibility.

The second correspondence relationship includes at least one group of shooting environment parameters and a second shooting parameter corresponding to each group of shooting environment parameters. One example of the second correspondence relationship is shown in Table 2.

When obtaining the current shooting environment parameter, the mobile terminal queries the second shooting parameter corresponding to the current shooting environment parameter in the second correspondence relationship. The second shooting parameter includes the second exposure time T2 and the actual photosensibility.

In step 305, it is detected whether the first exposure time T1 is greater than the second exposure time T2.

If T1 is greater than or equal to T2, step 306 is followed. If T1 is less than T2, step 307 is followed.

In step 306, the second exposure time T2 is set as the current exposure time, and the actual photosensibility is set as the current photosensibility, if the first exposure time T1 is greater than or equal to the second exposure time T2.

In step 307, the first exposure time T1 is set as the current exposure time, and it is detected whether a sum of the actual photosensibility and a compensation photosensibility is greater than a maximum photosensibility of the mobile terminal, if the first exposure time T1 is less than the second exposure time T2.

That is, if the first exposure time T1 is less than the second exposure time T2, on one hand, the mobile terminal sets the first exposure time T1 as the current exposure time.

On the other hand, since the actual photosensibility is determined according to the current environment parameter and the second exposure time T2, the mobile terminal may calculate a compensation photosensibility to compensate the actual photosensibility when selecting the first exposure time T1 as the current exposure time. The method of calculating the compensation photosensibility is not limited in this embodiment.

Since there is an upper limit of the photosensibility supported by the camera in the mobile terminal, the mobile terminal further detects whether the sum of the actual photosensibility and the compensation photosensibility is greater than the maximum photosensibility of the mobile terminal after calculating the compensation photosensibility.

If the sum of the actual photosensibility and the compensation photosensibility is greater than the maximum photosensibility, step 308 is followed.

If the sum of the actual photosensibility and the compensation photosensibility is less than the maximum photosensibility, step 309 is followed.

In step 308, the maximum photosensibility is set as the current photosensibility if the sum of the actual photosensibility and the compensation photosensibility is greater than the maximum photosensibility of the mobile terminal.

In step 309, the sum of the actual photosensibility and the compensation photosensibility is set as the current photosensibility if the sum of the actual photosensibility and the compensation photosensibility is less than the maximum photosensibility of the mobile terminal.

In step 310, the picture is shot according to the current shooting parameter.

The mobile terminal shoots the picture according to the current shooting parameter, i.e. the mobile terminal shoots the picture according to the current exposure time and the current photosensibility.

The mobile terminal may perform above steps automatically after a user presses the shutter, without the need of other manual operations from the user.

As described above, with the method for shooting a picture according to this embodiment, by determining the current shooting parameter according to the motion parameter of the mobile terminal, and by shooting the picture according to the current shooting parameter, the problem that there is obvious smear in the shot picture due to the movement of the mobile terminal is solved, thus achieving the effects that the current shooting parameter is determined according to the motion parameter of the mobile terminal and that there is no smear or little smear in the shot picture.

With the method for shooting a picture according to this embodiment, the smear may be avoided or reduced by selecting the shorter one of the first exposure time T1 and the second exposure time T2 as the current exposure time.

With the method for shooting a picture according to this embodiment, by taking the maximum photosensibility or the sum of the actual photosensibility and the compensation photosensibility as the current photosensibility when the first exposure time T1 is selected, the quality of the picture shot as the mobile terminal moves is guaranteed.

It should be explained that, although the method of calculating the compensation photosensibility is not limited in both the embodiment illustrated in FIG. 2 and the embodiment illustrated in FIG. 3, the compensation photosensibility in both the embodiment illustrated in FIG. 2 and the embodiment illustrated in FIG. 3 may be determined by a difference between the first exposure time T1 and the second exposure time T2.

As a possible implementation, the mobile terminal may preset a "difference-compensation photosensibility" table. If the first exposure time T1 is used as the current exposure time, the mobile terminal obtains the compensation photosensibility by searching the table.

As another possible implementation, the mobile terminal may calculate the compensation photosensibility in real time. Alternatively, compensation photosensibility=T2*actual photosensibility/T1−actual photosensibility. In other words, exposure=$\alpha$*T2*actual photosensibility=$\alpha$*T1*(actual photosensibility+compensation photosensibility).

Embodiments of a device according to the present disclosure are as follows, which may be configured to implement embodiments of the method according to the present disclosure. With regard to details not disclosed in the embodiments of the device according to the present disclosure, references are made with the embodiments of the method according to the present disclosure.

Figure 4:
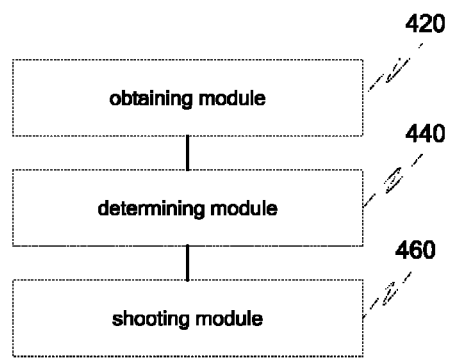
FIG. 4 is a block diagram illustrating a device for shooting a picture according to an exemplary embodiment of the present disclosure.

FIG. 4 is a block diagram illustrating a device for shooting a picture according to an exemplary embodiment of the present disclosure. The device for shooting a picture may be implemented by hardware, software or combinations thereof and configured as a mobile terminal or a part of a mobile terminal. The device for shooting a picture may include an obtaining module 420, a determining module 440 and a shooting module 460. Here, the term module includes a circuitry, which may include a circuit, a microchip, an integrated circuit, a micro sensor, or etc. The obtaining module 420 is configured to obtain a motion parameter of a mobile terminal. The determining module 440 is configured to determine a current shooting parameter according to the motion parameter. The shooting module 460 is configured to shoot the picture according to the current shooting parameter.

As described above, with the device for shooting a picture according to this embodiment, by determining the current shooting parameter according to the motion parameter of the mobile terminal, and by shooting the picture according to the current shooting parameter, the problem that there is obvious smear in the shot picture due to the movement of the mobile terminal is solved, thus achieving the effects that the current shooting parameter is determined according to the motion parameter of the mobile terminal and that there is no smear or little smear in the shot picture.

Figure 5:
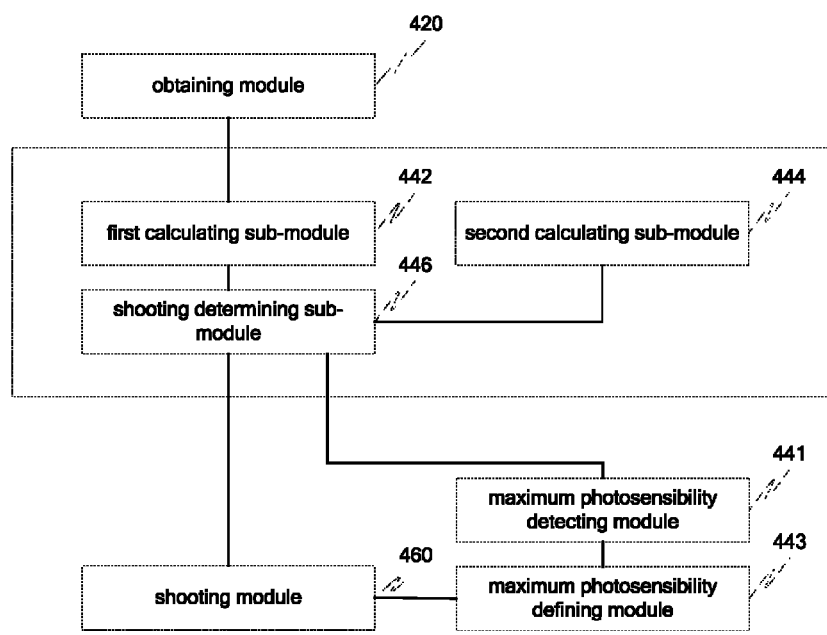
FIG. 5 is a block diagram illustrating a device for shooting a picture according to another exemplary embodiment of the present disclosure.

FIG. 5 is a block diagram illustrating a device for shooting a picture according to another exemplary embodiment of the present disclosure. The device for shooting a picture may be implemented by hardware, software or combinations thereof and configured as a mobile terminal or a part of a mobile terminal. The device for shooting a picture may include an obtaining module 420, a determining module 440 and a shooting module 460. The obtaining module 420 is configured to obtain a motion parameter of a mobile terminal. The determining module 440 is configured to determine a current shooting parameter according to the motion parameter. The shooting module 460 is configured to shoot the picture according to the current shooting parameter.

Alternatively or additionally, the determining module 440 may include: a first calculating sub-module 442 configured to calculate a first shooting parameter according to the motion parameter, a second calculating sub-module 444 configured to calculate a second shooting parameter according to a shooting environment parameter, in which the shooting environment parameter is a parameter of an environment of the mobile terminal, and a shooting determining sub-module 446 configured to determine the current shooting parameter according to the first shooting parameter and the second shooting parameter.

Alternatively or additionally, the first shooting parameter may include a first exposure time T1, the second shooting parameter includes a second exposure time T2 and an actual photosensibility.

The shooting determining sub-module 446 is further configured to select one of the first shooting parameter and the second shooting parameter as the current shooting parameter according to a predetermined condition. The predetermined condition includes that a shorter one of the first exposure time T1 and the second exposure time T2 is set as a current exposure time. Alternatively, the predetermined condition may further include that a current exposure is ensured to be an exposure corresponding to the shooting environment parameter. If the aperture value is constant, the exposure may be calculated by a formula of exposure=$\alpha$*exposure time in the second shooting parameter*actual photosensibility in the second shooting parameter, where $\alpha$ is a predetermined constant.

The shooting determining sub-module 446 is further configured to set the second exposure time T2 as the current exposure time and set an actual photosensibility as the current photosensibility if the first exposure time T1 is greater than or equal to the second exposure time T2, and configured to set the first exposure time T1 as the current exposure time and set a sum of the actual photosensibility and a compensation photosensibility as the current photosensibility if the first exposure time T1 is less than the second exposure time T2.

Alternatively, the compensation photosensibility is determined by a difference between the first exposure time T1 and the second exposure time T2. Alternatively, compensation photosensibility=T2*actual photosensibility/T1−actual photosensibility. In other words, exposure=$\alpha$*T2*actual photosensibility=$\alpha$*T1*(actual photosensibility+compensation photosensibility).

Alternatively or additionally, the device for shooting a picture may further include a maximum photosensibility detecting module 441 and a maximum photosensibility setting module 443. The maximum photosensibility detecting module 441 is configured to detect whether the sum of the actual photosensibility and the compensation photosensibility is greater than a maximum photosensibility of the mobile terminal. The maximum photosensibility setting module 443 is configured to set the maximum photosensibility as the current photosensibility if the maximum sensitively detecting module 441 detects that the sum of the actual photosensibility and the compensation photosensibility is greater than the maximum photosensibility of the mobile terminal.

The shooting determining sub-module 446 is further configured to set the sum of the actual photosensibility and the compensation photosensibility as the current photosensibility if the maximum photosensibility detecting module 441 detects that the sum of the actual photosensibility and the compensation photosensibility is less than the maximum photosensibility of the mobile terminal.

Alternatively or additionally, the first calculating sub-module 442 may be configured to query the first shooting parameter corresponding to the motion parameter in a first correspondence relationship, in which the first correspondence relationship includes at least one group of motion parameters and a first shooting parameter corresponding to each group of motion parameters.

Alternatively or additionally, the second calculating sub-module 444 may be configured to query the second shooting parameter corresponding to the shooting environment parameter in a second correspondence relationship, in which the second correspondence relationship includes at least one group of shooting environment parameters and a second shooting parameter corresponding to each group of shooting environment parameters.

As described above, with the device for shooting a picture according to this embodiment, by determining the current shooting parameter according to the motion parameter of the mobile terminal, and by shooting the picture according to the current shooting parameter, the problem that there is obvious smear in the shot picture due to the movement of the mobile terminal is solved, thus achieving the effects that the current shooting parameter is determined according to the motion parameter of the mobile terminal and that there is no smear or little smear in the shot picture.

With the device for shooting a picture according to this embodiment, the smear may be avoided or reduced by selecting the shorter one of the first exposure time T1 and the second exposure time T2 as the current exposure time.

With the device for shooting a picture according to this embodiment, by taking the maximum photosensibility or the sum of the actual photosensibility and the compensation photosensibility as the current photosensibility when the first exposure time T1 is selected, the quality of the picture shot as the mobile terminal moves is guaranteed.

With respect to the devices in above embodiments, the specific operation manners for individual modules therein refer to those described in detail in the embodiments regarding the methods, which are not elaborated herein again.

Figure 6:
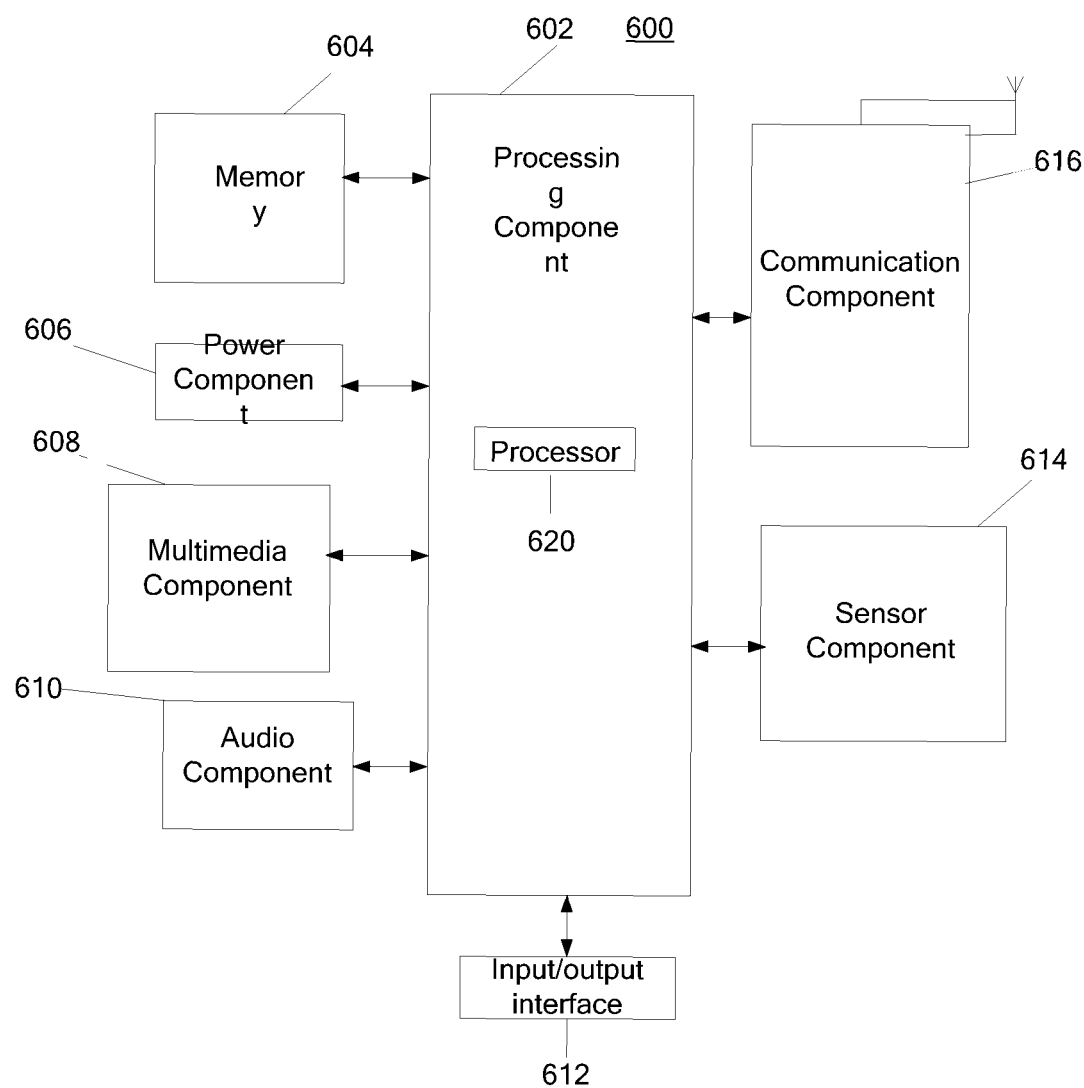
FIG. 6 is a block diagram illustrating a device for shooting a picture according to an exemplary embodiment of the present disclosure.

FIG. 6 is a block diagram of a device 600 for shooting a picture according to an exemplary embodiment of the present disclosure. For example, the device 600 may be a mobile phone, a computer, a digital broadcast terminal, a messaging device, a gaming console, a tablet, a medical device, an exercise equipment, a personal digital assistant, and the like.

Referring to FIG. 6, the device 600 may include one or more of the following circuitry components: a processing component 602, a memory 604, a power component 606, a multimedia component 608, an audio component 610, an input/output (I/O) interface 612, a sensor component 614, and a communication component 616.

The processing component 602 typically controls overall operations of the device 600, such as the operations associated with display, telephone calls, data communications, camera operations, and recording operations. The processing component 602 may include one or more processors 620 to execute instructions to perform all or part of the steps in the above described methods. Moreover, the processing component 602 may include one or more modules which facilitate the interaction between the processing component 602 and other components. For instance, the processing component 602 may include a multimedia module to facilitate the interaction between the multimedia component 608 and the processing component 602.

The memory 604 is configured to store various types of data to support the operation of the device 600. Examples of such data include instructions for any applications or methods operated on the device 600, contact data, phonebook data, messages, pictures, video, etc. The memory 604 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 606 provides power to various components of the device 600. The power component 606 may include a power management system, one or more power sources, and any other components associated with the generation, management, and distribution of power in the device 600.

The multimedia component 608 includes a screen providing an output interface between the device 600 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 608 includes a front camera and/or a rear camera. The front camera and the rear camera may receive an external multimedia datum while the device 600 is in an operation mode, such as a photographing mode or a video mode. Each of the front camera and the rear camera may be a fixed optical lens system or have focus and optical zoom capability.

The audio component 610 is configured to output and/or input audio signals. For example, the audio component 610 includes a microphone (MIC) configured to receive an external audio signal when the device 600 is in an operation mode, such as a call mode, a recording mode, and a voice recognition mode. The received audio signal may be further stored in the memory 604 or transmitted via the communication component 616. In some embodiments, the audio component 610 further includes a speaker to output audio signals.

The I/O interface 612 provides an interface between the processing component 602 and peripheral interface modules, such as a keyboard, a click wheel, buttons, and the like. The buttons may include, but are not limited to, a home button, a volume button, a starting button, and a locking button.

The sensor component 614 includes one or more sensors to provide status assessments of various aspects of the device 600. For instance, the sensor component 614 may detect an open/closed status of the device 600, relative positioning of components, e.g., the display and the keypad, of the device 600, a change in position of the device 600 or a component of the device 600, a presence or absence of user contact with the device 600, an orientation or an acceleration/deceleration of the device 600, and a change in temperature of the device 600. The sensor component 614 may include a proximity sensor configured to detect the presence of nearby objects without any physical contact. The sensor component 614 may also include a light sensor, such as a CMOS or CCD image sensor, for use in imaging applications. In some embodiments, the sensor component 614 may also include an accelerometer sensor, a gyroscope sensor, a magnetic sensor, a pressure sensor, or a temperature sensor.

The communication component 616 is configured to facilitate communication, wired or wirelessly, between the device 600 and other devices. The device 600 can access a wireless network based on a communication standard, such as WiFi, 2G, or 3G, or a combination thereof. In one exemplary embodiment, the communication component 616 receives a broadcast signal or broadcast associated information from an external broadcast management system via a broadcast channel. In one exemplary embodiment, the communication component 616 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the device 600 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, there is also provided a non-transitory computer-readable storage medium including instructions, such as the memory 604 including instructions, the above instructions are executable by the processor 620 in the device 600, for performing the above-described methods. For example, the non-transitory computer-readable storage medium may be a ROM, a RAM, a CD-ROM, a magnetic tape, a floppy disc, an optical data storage device, and the like.

A non-transitory computer-readable storage medium is provided. Instructions in the storage medium, when executed by a processor of the device 600, cause the device 600 to perform a method for shooting a picture.

Other embodiments of the invention will be apparent to those skilled in the art from consideration of the specification and practice of the invention disclosed here. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

References in the specification to "one embodiment," "an embodiment," "an example embodiment," "exemplary embodiment," or the like, indicate that the embodiment described may include a particular feature, structure, or characteristic, but every embodiment may not necessarily include the particular feature, structure, or characteristic. Moreover, such phrases are not necessarily referring to the same embodiment. Furthermore, when a particular feature, structure, or characteristic is described in connection with an embodiment, it is submitted that it is within the knowledge of one skilled in the art to implement such feature, structure, or characteristic in connection with other embodiments whether or not explicitly described.

It will be appreciated that the present invention is not limited to the exact construction that has been described above and illustrated in the accompanying drawings, and that various modifications and changes can be made without departing from the scope thereof. It is intended that the scope of the invention only be limited by the appended claims.

What is claimed is:

1. A method for shooting a picture, comprising:
   obtaining, by a mobile terminal including a processor and a motion sensor, a motion parameter of the mobile terminal from the motion sensor and an actual photosensibility;
   determining, by the mobile terminal, a current shooting parameter according to the motion parameter and the actual photosensibility; and
   shooting, by the mobile terminal, the picture according to the current shooting parameter;
   wherein determining the current shooting parameter according to the motion parameter and the actual photosensibility comprises:
   calculating a first shooting parameter according to the motion parameter;
   calculating a second shooting parameter according to a shooting environment parameter, wherein the shooting environment parameter is a parameter at least partially indicating an environment of the mobile terminal; and
   determining the current shooting parameter according to the first shooting parameter and the second shooting parameter,
   wherein the first shooting parameter comprises a first exposure time T1, the second shooting parameter comprises a second exposure time T2 and the actual photosensibility; and
   wherein determining the current shooting parameter according to the first shooting parameter and the second shooting parameter comprises:
   setting the second exposure time T2 as a current exposure time and setting the actual photosensibility as a current photosensibility when the first exposure time T1 is greater than or equal to the second exposure time T2; and
   setting the first exposure time T1 as the current exposure time and setting a sum of the actual photosensibility and a compensation photosensibility as the current photosensibility when the first exposure time T1 is less than the second exposure time T2.

2. The method according to claim 1, further comprising:
   detecting whether the sum of the actual photosensibility and the compensation photosensibility is greater than a maximum photosensibility of the mobile terminal;
   setting the maximum photosensibility as the current photosensibility if the sum of the actual photosensibility and the compensation photosensibility is greater than the maximum photosensibility of the mobile terminal; and
   setting the sum of the actual photosensibility and the compensation photosensibility as the current photosensibility if the sum of the actual photosensibility and the compensation photosensibility is less than the maximum photosensibility of the mobile terminal.

3. The method according to claim 1, wherein calculating the first shooting parameter according to the motion parameter comprises:
   querying the first shooting parameter corresponding to the motion parameter in a first correspondence relationship, wherein the first correspondence relationship comprises at least one group of motion parameters and the first shooting parameter corresponding to each group of motion parameters.

4. The method according to claim 1, wherein calculating the second shooting parameter according to the shooting environment parameter comprises:
   querying the second shooting parameter corresponding to the shooting environment parameter in a second correspondence relationship, wherein the second correspondence relationship comprises at least one group of shooting environment parameters and the second shooting parameter corresponding to each group of the shooting environment parameters.

5. A device for shooting a picture, comprising:
   a processor and at least one sensor;
   a memory configured to store instructions executable by the processor;
   wherein the processor is configured to:
   obtain a motion parameter of a mobile terminal from the at least one sensor and an actual photosensibility;
   determine a current shooting parameter according to the motion parameter and the actual photosensibility; and
   shoot the picture according to the current shooting parameter;
   wherein the processor is further configured to:
   calculate a first shooting parameter according to the motion parameter;
   calculate a second shooting parameter according to a shooting environment parameter, wherein the shooting environment parameter is a parameter of an environment of the mobile terminal; and
   determine the current shooting parameter according to the first shooting parameter and the second shooting parameter,
   wherein the first shooting parameter comprises a first exposure time T1, the second shooting parameter comprises a second exposure time T2 and the actual photosensibility, and the processor is further configured to:
   set the second exposure time T2 as a current exposure time and set the actual photosensibility as a current photosensibility, if the first exposure time T1 is greater than or equal to the second exposure time T2; and
   set the first exposure time T1 as the current exposure time and set a sum of the actual photosensibility and a compensation photosensibility as the current photosensibility, if the first exposure time T1 is less than the second exposure time T2.

6. The device according to claim 5, wherein the processor is further configured to:
   detect whether the sum of the actual photosensibility and the compensation photosensibility is greater than a maximum photosensibility of the mobile terminal;
   set the maximum photosensibility as the current photosensibility, if the sum of the actual photosensibility and the compensation photosensibility is greater than the maximum photosensibility of the mobile terminal; and
   set the sum of the actual photosensibility and the compensation photosensibility as the current photosensibility, if the sum of the actual photosensibility and the compensation photosensibility is less than the maximum photosensibility of the mobile terminal.

7. The device according to claim 5, wherein the processor is further configured to:
   query the first shooting parameter corresponding to the motion parameter in a first correspondence relationship, wherein the first correspondence relationship comprises at least one group of motion parameters and the first shooting parameter corresponding to each group of the motion parameters.

8. The device according to claim 5, wherein the processor is further configured to:
  query the second shooting parameter corresponding to the shooting environment parameter in a second correspondence relationship, wherein the second correspondence relationship comprises at least one group of shooting environment parameters and the second shooting parameter corresponding to each group of the shooting environment parameters.

9. A device for shooting a picture, comprising one or more circuitries configured to:
  obtain a motion parameter of a mobile terminal and an actual photosensibility;
  determine a current shooting parameter according to the motion parameter and the actual photosensibility; and
  shoot the picture according to the current shooting parameter;
where in the one or more circuitries are further configured to:
  calculate a first shooting parameter according to the motion parameter;
  calculate a second shooting parameter according to a shooting environment parameter, wherein the shooting environment parameter is a parameter of an environment of the mobile terminal; and
  determine the current shooting parameter according to the first shooting parameter and the second shooting parameter,
  wherein the first shooting parameter comprises a first exposure time T1, the second shooting parameter comprises a second exposure time T2 and the actual photosensibility, and the one or more circuitries are further configured to:
  set the second exposure time T2 as a current exposure time and set the actual photosensibility as a current photosensibility, if the first exposure time T1 is greater than or equal to the second exposure time T2; and
  set the first exposure time T1 as the current exposure time and set a sum of the actual photosensibility and a compensation photosensibility as the current photosensibility, if the first exposure time T1 IS less than the second exposure time T2.

10. The device according to claim 9, where in the one or more circuitries are further configured to:
  detect whether the sum of the actual photosensibility and the compensation photosensibility is greater than a maximum photosensibility of the mobile terminal;
  set the maximum photosensibility as the current photosensibility, if the sum of the actual photosensibility and the compensation photosensibility is greater than the maximum photosensibility of the mobile terminal; and
  set the sum of the actual photosensibility and the compensation photosensibility as the current photosensibility, if the sum of the actual photosensibility and the compensation photosensibility is less than the maximum photosensibility of the mobile terminal.

11. The device according to claim 9, where in the one or more circuitries are further configured to:
  query the first shooting parameter corresponding to the motion parameter in a first correspondence relationship, wherein the first correspondence relationship comprises at least one group of motion parameters and the first shooting parameter corresponding to each group of the motion parameters.

12. The device according to claim 9, where in the one or more circuitries are further configured to:
  query the second shooting parameter corresponding to the shooting environment parameter in a second correspondence relationship, wherein the second correspondence relationship comprises at least one group of shooting environment parameters and the second shooting parameter corresponding to each group of the shooting environment parameters.

* * * * *